(12) United States Patent
Wang

(10) Patent No.: US 7,440,150 B2
(45) Date of Patent: Oct. 21, 2008

(54) FLATBED SENSOR

(75) Inventor: Chih-Kuang Wang, Hsin Chu (TW)

(73) Assignee: Microtek International Inc., Hsinchu (TW)

( * ) Notice: Subject to any disclaimer, the term of this patent is extended or adjusted under 35 U.S.C. 154(b) by 1007 days.

(21) Appl. No.: 10/895,345

(22) Filed: Jul. 21, 2004

(65) Prior Publication Data
US 2005/0063024 A1 Mar. 24, 2005

(30) Foreign Application Priority Data
Sep. 24, 2003 (TW) .............................. 92217157 U

(51) Int. Cl.
*H04N 1/04* (2006.01)
*H04N 1/00* (2006.01)
(52) U.S. Cl. .................. 358/497; 358/487; 358/474; 358/408
(58) Field of Classification Search ................. 358/497, 358/487, 474, 408, 494, 509
See application file for complete search history.

(56) References Cited
U.S. PATENT DOCUMENTS
7,149,012 B2 * 12/2006 Fang et al. .................. 358/497

FOREIGN PATENT DOCUMENTS

| TW | 364710 | 4/1987 |
|---|---|---|
| TW | 481405 | 4/1989 |
| TW | 477510 | 8/1989 |
| TW | 484776 | 8/1989 |

* cited by examiner

*Primary Examiner*—Houshang Safaipour
(74) *Attorney, Agent, or Firm*—Muncy, Geissler, Olds & Lowe PLLC

(57) ABSTRACT

A flatbed scanner includes a housing, a glass plate fixed to the housing, a front rib formed at a bottom face of a front part of the housing and extending downward, a back rib formed at a bottom face of the back part of the housing and extending downward, and side ribs formed at two sides of the housing and extending toward the center of the housing. The inner distance from the back rib to the front rib is not smaller than the length of the glass plate. The side ribs are under the bottom faces of the front part and the back part so as to form a fastening gap. Because the distance between the side ribs is smaller than the width of the glass plate, when the glass plate is inserted into the fastening gap, the glass plate is held.

20 Claims, 11 Drawing Sheets

FLATBED SENSOR

BACKGROUND

This application claims the benefit of the filing date of Taiwan Application Ser. No. 092217157, filed Sep. 24, 2003, the content of which is incorporated herein by reference.

The invention relates to a flatbed scanner, and more particularly to a flatbed scanner with a short border such that a to-be-scanned book can completely attached to and completed supported by the flatbed scanner.

A scanner, copier and the like use an optical module to acquire an image of a to-be-scanned document. Various document support structures for supporting the to-be-scanned document as disclosed in, for example, Taiwan Patent Publication Nos. 364710, 477510, 484776 and 481405 have been developed and used. For example, in the conventional document support structures of the flatbed scanners, when the user wants to acquire the image of a book, the central binding portion C of the book B of FIG. 1 cannot smoothly contact the glass plate 12 of the flatbed scanner because the limitation of the housing 11. Thus, when the optical module OS scans the book B, the scanned image may have shadows and deformations at the central binding portion C of the book B because the optical path OT cannot reach the central binding portion C of the book B.

Taiwan Patent Publication No. 364710 discloses an upper housing of a flatbed scanner, in which a fastener at a side and three resilient fasteners at three sides are used to fasten the glass plate. In this case, the reliability is insufficient, and an auxiliary tape or other fixing members have to be used in order to prevent the glass plate from falling down. In addition, when the image of the book is scanned according to this structure, the optical path cannot reach the central binding portion of the book when the optical module is scanning because a gap is left between the book's central binding portion and the glass plate of the flatbed scanner. Hence, the scan result includes shadows, deformations and the like at the book's central binding portion.

Taiwan Patent Publication No. 477510 discloses a fixing structure for fixing a glass plate of a scanner using a fastener at a side and a plurality of ribs and a cam-link mechanism. According to this structure, when the image of the book is scanned, the optical path of the optical module cannot reach the book's central binding portion because a gap is left between the book's central binding portion and the glass plate of the flatbed scanner owing to the existence of the ribs. Hence, the scanned result includes shadows, deformations, and the like at the book's central binding portion. In addition, this structure has to use more members, so the assembly is complicated and the manufacturing cost is high.

Taiwan Patent Publication No. 484776 discloses a supporting mechanism for a glass plate of a scanner, wherein an inverse-U shaped sliding slot is used to fix the glass plate. According to this structure, when the book's image is scanned, the optical path of the optical module cannot reach the book's central binding portion owing to the step between the sliding slot and the glass plate. Hence, the scan result includes shadows, deformations and the like at the book's central binding portion.

Taiwan Patent Publication No. 481405 discloses a simple device for fixing a glass plate without adhesive, in which a plurality of seats is formed at four corners of the supporting mechanism and a plurality of projecting plates are formed at four edges to fixing the glass plate. According to this structure, when the book's image is scanned, the optical path of the optical module cannot reach the book's central binding portion because a step exists between the projecting plates and the glass plate. Hence, the scanned result includes shadows, deformations, and the like at the book's central binding portion. As shown in FIG. 5 of this Taiwan patent, if the glass plate interferes with the seat and is then pressed into the seat (the two sides of the glass plate of FIG. 5C have reach the seat) when the glass plate is placed down, it means that the seat also has the property of resilient fixing property (the resilience of the glass plate is extremely poor), and the problem of insufficient reliability in the 364710 patent still exists in the 481405 patent. If the glass plate can be directly put into the seat without interfering with the seat when the glass plate is placed down, it is doubtful as to the actual reliability of preventing the glass plate from falling down using the anti-slip sheet during the transportation procedure (because it claims that no tape or other fixing member has to be used).

SUMMARY

In view of the above-mentioned problems, an object of the invention is to provide a simple structure, which is for making the optical path of the optical module reach the book's binding portion and is capable of preventing shadows and deformations from being caused in the scanned image at the book's binding portion. Thus, a clear scanned image may be obtained according to the document support structure of the flatbed scanner.

To achieve the above-mentioned object, the invention provides a flatbed scanner with a short border. The scanner includes a housing, a glass plate, a front rib, a back rib, and side ribs. The housing has a bottom, two sides, a front part and a back part. The front rib is formed at a bottom face of the front part and extends downward. The back rib is formed at a bottom face of the back part and extends downward. An inner distance from the back rib to the front rib is not smaller than a length of the glass plate. The side ribs are formed between the two sides and extend inward. The side ribs are under the bottom faces of the front part and the back part so as to form a fastening gap. Because the distance between the side ribs is smaller than the width of the glass plate, when the glass plate is inserted into the fastening gap, the glass plate is held without other elements.

DETAILED DESCRIPTION OF THE INVENTION

The flatbed scanner of the invention with a short border will be described with reference to the accompanying drawings.

Figure 1:
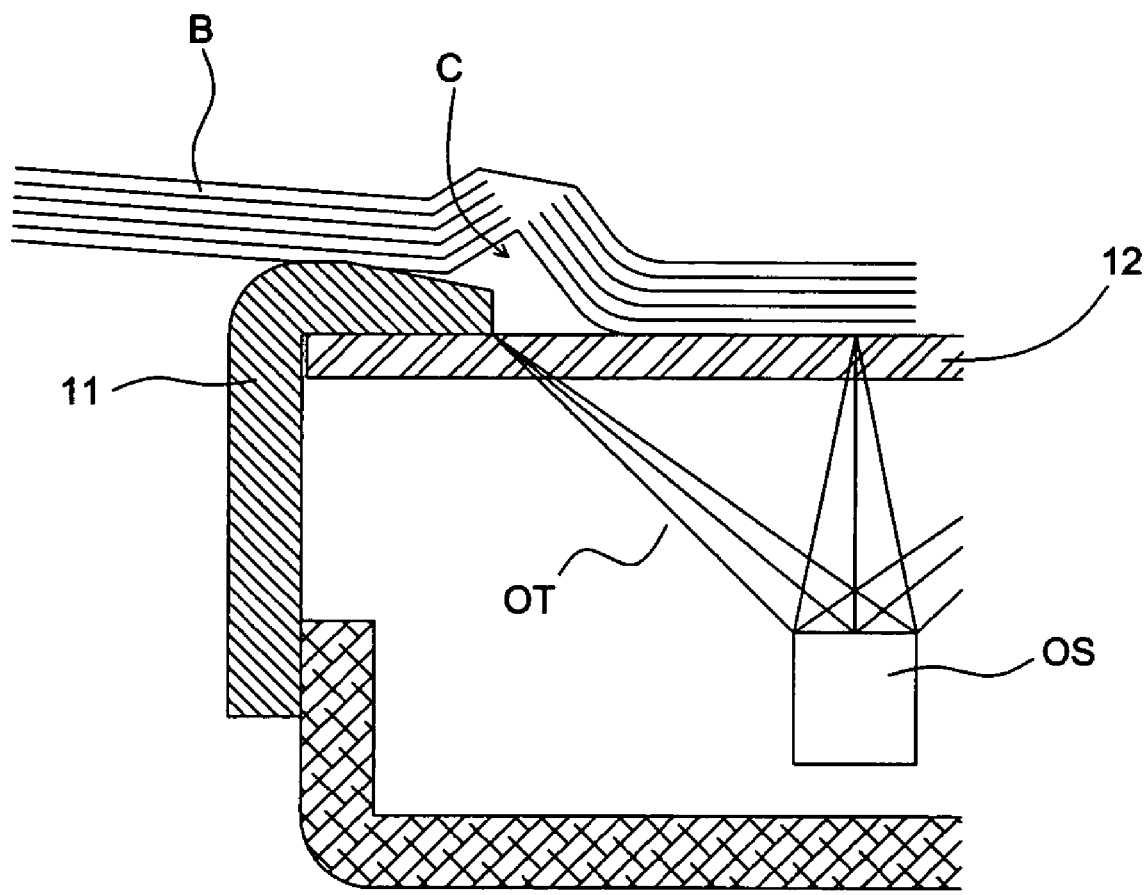
FIG. 1 shows a document support structure for a conventional flatbed scanner, wherein when the scanner is scanning a book, shadows and deformations will be caused at the book's central binding portion because the book cannot smoothly contact the glass plate of the flatbed scanner.
Figure 2A:
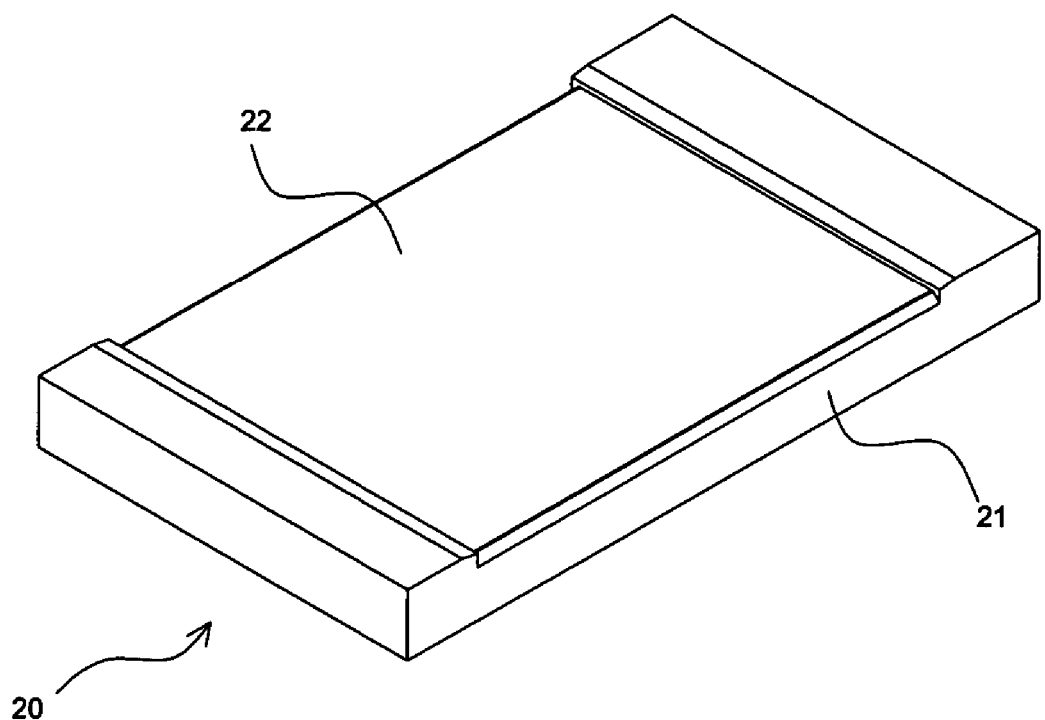
FIG. 2(A) shows the pictorial view of a document support structure for a flatbed scanner of the invention.
Figure 2B:
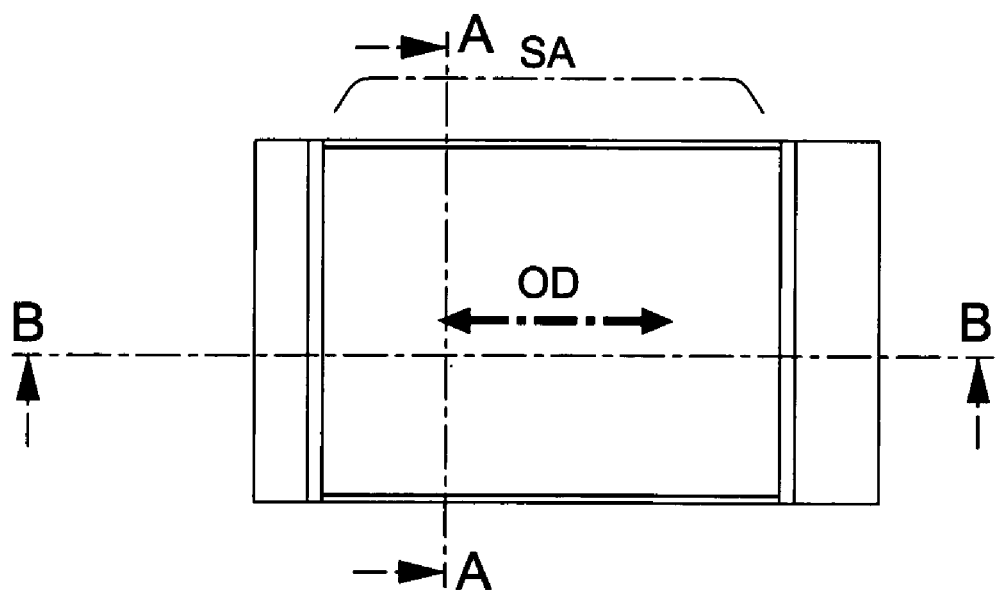
FIG. 2(B) shows a top view of FIG. 2(A).

FIG. 2(A) shows the pictorial view of a document support structure for a flatbed scanner of the invention. FIG. 2(B) shows a top view of FIG. 2(A). As shown in FIGS. 2(A) and 2(B), the flatbed scanner 20 includes a housing 21 and a scanning platform 22. The scanning platform may be a glass plate or other transparent members. The optical module (not shown) of the scanner 20 is moved in a length direction OD of the housing 21. When the book is scanned, the length direction of the to-be-scanned book is caused to be in correspondence with the length direction of the housing 21, and the binding portion of the book is caused to stack on the long side of the housing 21, wherein symbol OD denotes the moving direction of the optical module and symbol SA denotes the scanning area. In order to make the scanning area of the scanning platform close to the side of the housing, the invention proposes a combination structure between the scanning platform and the housing. The combination structure includes a side structure, a front structure and a back structure. The so-called side structure represents the combined structure between the scanning platform and the side of the housing. The so-called front (back) structure represents the combined structure between the scanning platform and the front (back) end of the housing.

Figure 3:
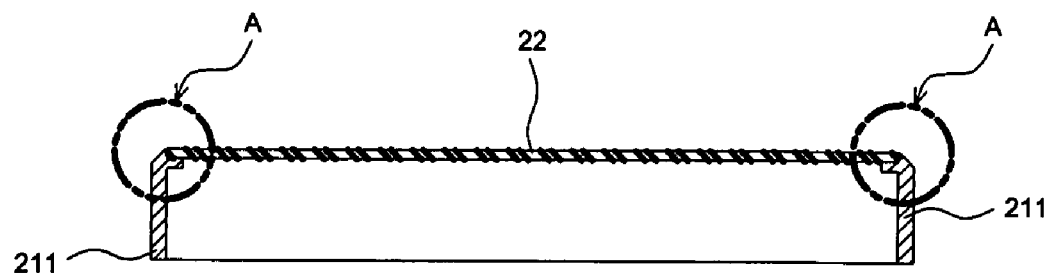
FIG. 3 shows a cross-sectional view taken along a line A-A of FIG. 2(B).
Figure 4:
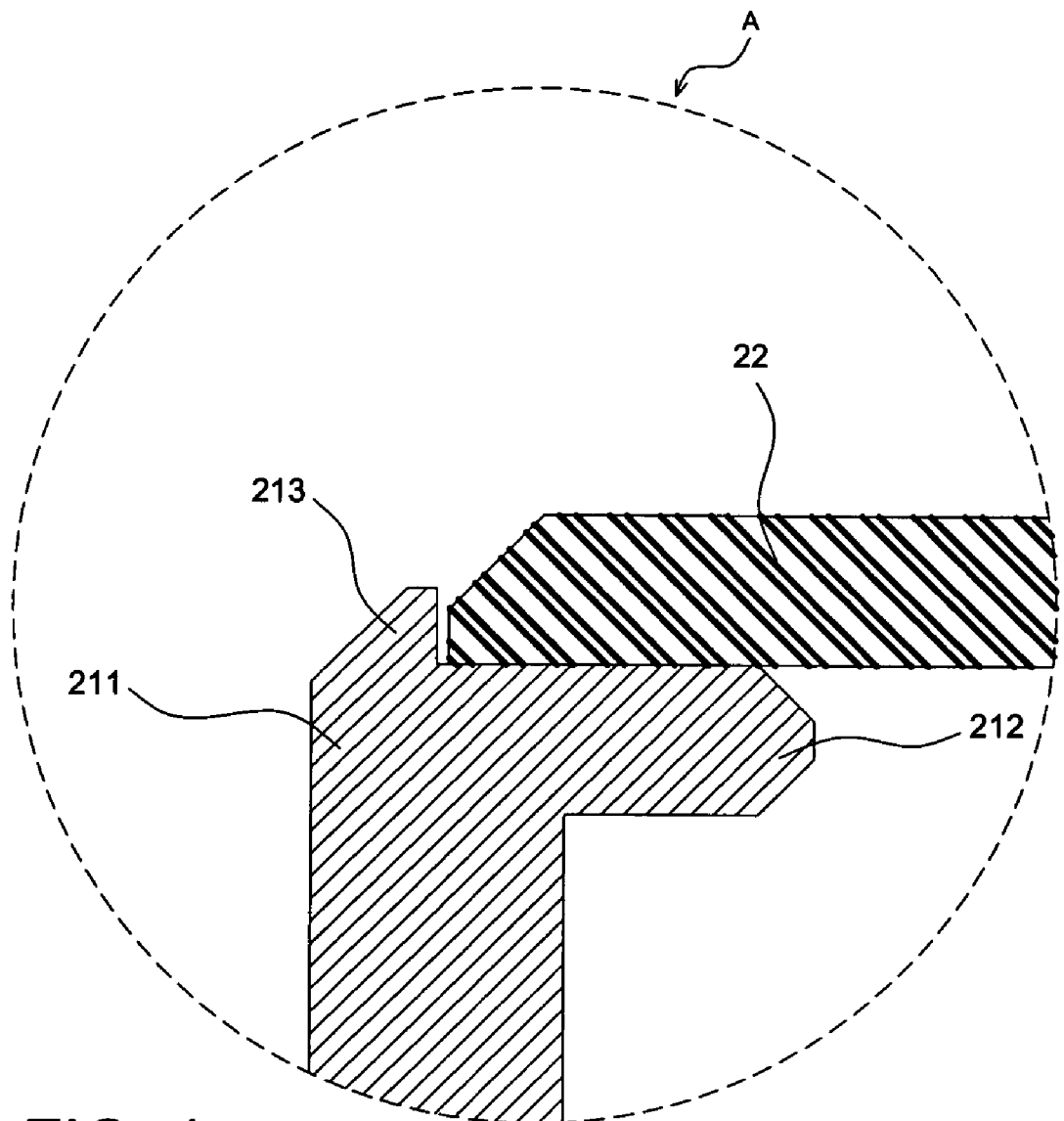
FIG. 4 shows an enlarged view at a corner of FIG. 3.

FIG. 3 shows a cross-sectional view taken along a line A-A of FIG. 2(B). FIG. 4 shows an enlarged view of the region A of FIG. 3. As shown in FIG. 3, the region A is the side structure. As shown in FIG. 4, the side structure A includes a housing side 211, a side rib (first fixing part) 212, and a side projecting portion (second fixing part) 213. The side rib 212 extends in a direction parallel to the glass plate. The side rib 212 and the side projecting portion 213 define an L shape, and may be integrally formed using an insulation material by way of plastic molding. The glass plate 22 and the housing 21 may be attached to each other by an adhesive tape.

In this embodiment, the housing 21 is not limited to the above-mentioned structure. For example, if the front and back structures have structures to prevent the glass plate from being moved in the lateral side direction, the side projecting portion 213 may be omitted such that the side of the glass plate 22 smoothly contacts the housing side 211. In addition, the number of the side rib(s) 212 of the housing 21 may be one or more than one. In addition, although the side rib 212 is formed toward the inner direction, it may be formed toward the outer direction. In addition, it is possible to chamfer the end portions of the side rib 212 and the side projecting portion 213.

Figure 5A:
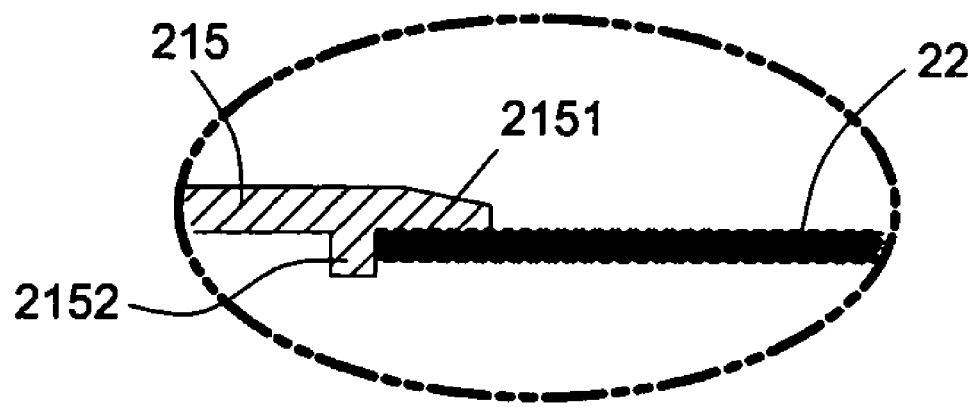
FIGS. 5(A) and (B) show cross-sectional views taken along a line B-B of FIG. 2(B).
Figure 5B:
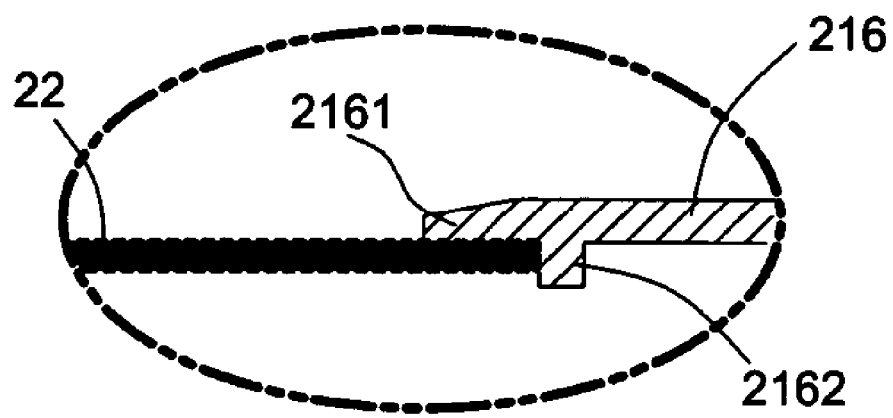

Next, the front and back fixing structures between the housing 21 and the glass plate 22 will be illustrated. FIGS. 5(A) and (B) show cross-sectional views taken along a line B-B of FIG. 2(B). As shown in FIG. 5(A), the front structure includes a front housing 215, a front projecting portion 2151, and a front rib 2152. The glass plate 22 is pushed against the front rib 2152 for fastening according to the resilience of the front projecting portion 2151. The number of the front rib(s) 2152 may be one or more than one. As shown in FIG. 5(B), the back structure includes a back housing 216, a back projecting portion 2161 and a back rib 2162. The glass plate 22 is pushed against the back rib 2162 for fastening according to the resilience of the back projecting portion 2161. The number of the back rib(s) 2162 may be one or more than one.

Figure 6A:
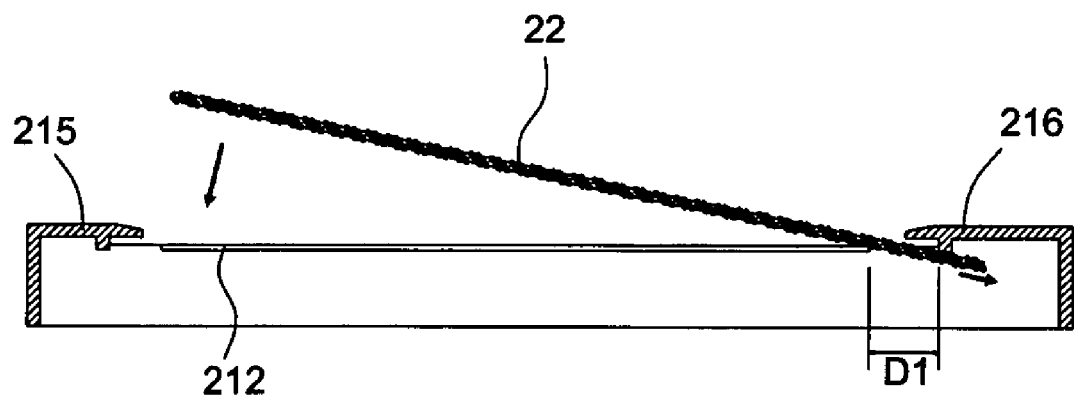
FIGS. 6(A) to 6(C) show schematic illustration of the glass plate mounted to the housing, wherein the length of the glass plate substantially equals the distance from the front rib to the back rib.
Figure 6B:
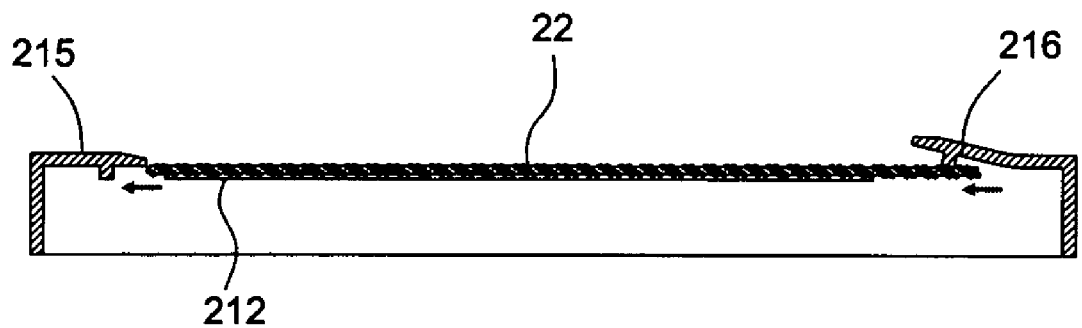
Figure 6C:
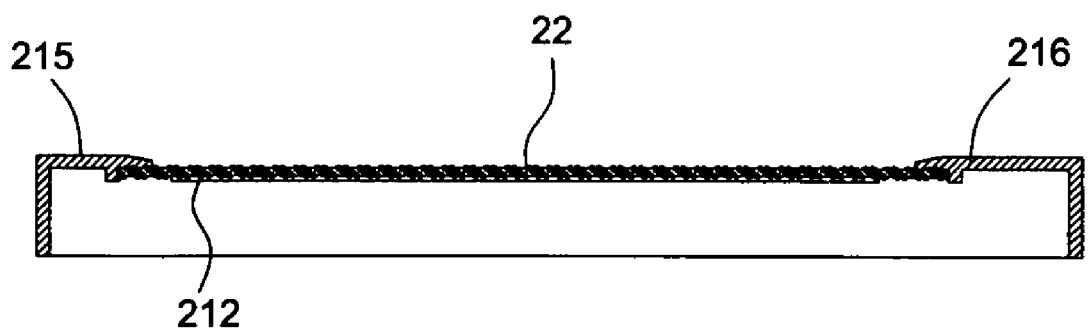

FIGS. 6(A) to 6(C) show schematic illustration of the glass plate mounted to the housing, wherein the length of the glass plate substantially equals the distance from the front rib to the back rib. As shown in FIG. 6(A), because a clearance D1 exists between the side rib 212 and the back rib 2162, the first end of the glass plate 22 is firstly inserted into the clearance D1. Thereafter, because the housing is made of the resilient material, as shown in FIG. 6(B), the second end of the glass plate 22 may be pressed downward such that the glass plate 22 smoothly contacts the side rib 212. Finally, the glass plate 22 is moved toward the front end and then to front rib 2152. If the length of the glass plate 22 is slightly smaller than the distance from the front rib 2152 to the back rib 2162, the glass plate 22 may be completely fastened between the front rib 2152 and the back rib 2162. Hence, this method can fasten the glass plate without falling down by the front projecting portion 2151, the back projecting portion 2161 and the side rib 212. Consequently, the document support structure of the invention does not need any extra adhesive processing.

Figure 7A:
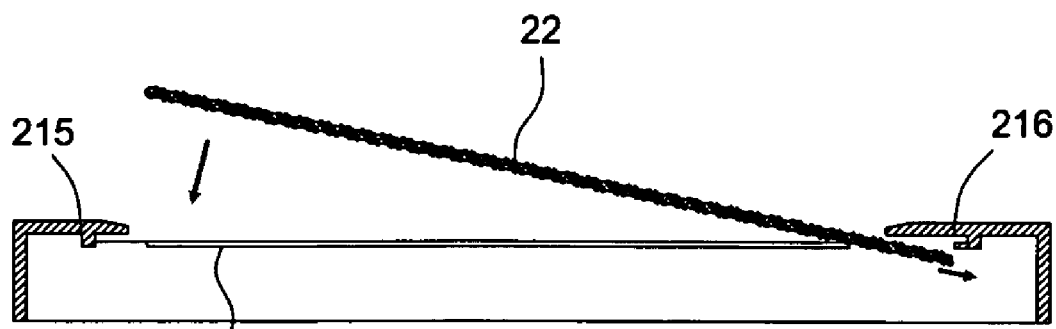
FIGS. 7(A) to 7(D) show schematic illustrations of the glass plate mounted to the housing in another way, wherein the length of the glass plate is smaller than the distance from the front rib to the back rib.
Figure 7B:
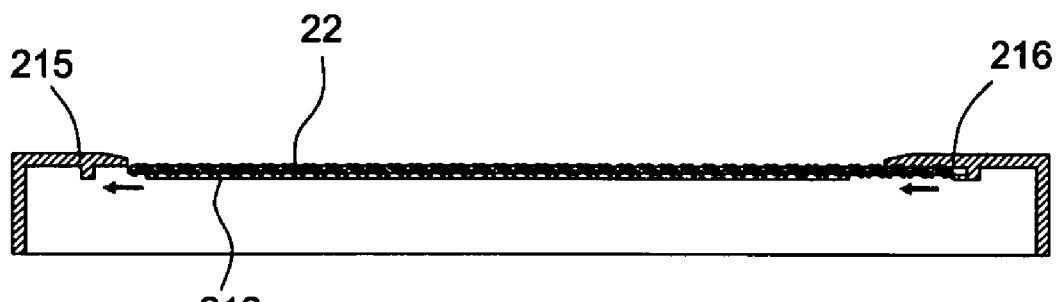
Figure 7C:
Figure 7D:
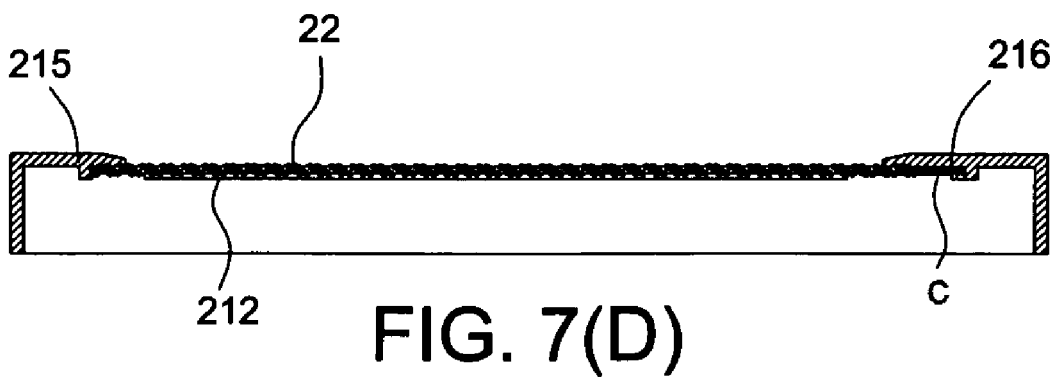

FIGS. 7(A) to 7(D) show schematic illustrations of the glass plate mounted to the housing in another way, wherein the length of the glass plate is smaller than the distance from the front rib to the back rib. As shown in FIG. 7(A), because a clearance D1 exists between the side rib 212 and the back rib 2162, the first end of the glass plate 22 is first inserted into the clearance D1. Thereafter, as shown in FIG. 7(B), the second end of the glass plate 22 may be pressed down such that the glass plate 22 smoothly contacts the side rib 212. Next, the glass plate 22 is moved toward the front end and then to the front rib 2152. Because the length of the glass plate 22 is shorter than the distance from the front rib 2152 to the back rib 2162, the back housing 216 is free from being bent and deformed when the glass plate 22 is pressed downward. However, this method causes a gap between the glass plate 22 and the back rib 2162. So, as shown in FIG. 7(D), the back rib 2162 may form an L shape, and an engagement piece C is inserted into the gap from the back rib 2162 such that the glass plate is free from being moved back and forth. This method can fasten the glass plate without falling down by the front projecting portion 2151, the back projecting portion 2161, the side rib 212, and the engagement piece C. Consequently, the document support structure of the invention does not need any extra adhesive processing.

Figure 8A:
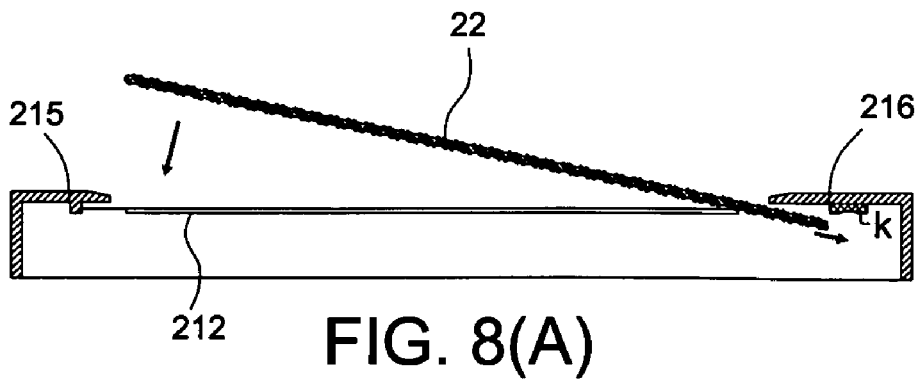
FIGS. 8(A) to 8(D) show schematic illustration of the glass plate mounted to the housing in still another way, wherein the length of the glass plate is smaller than the distance from the front rib to the back rib and the back rib is movable.
Figure 8B:
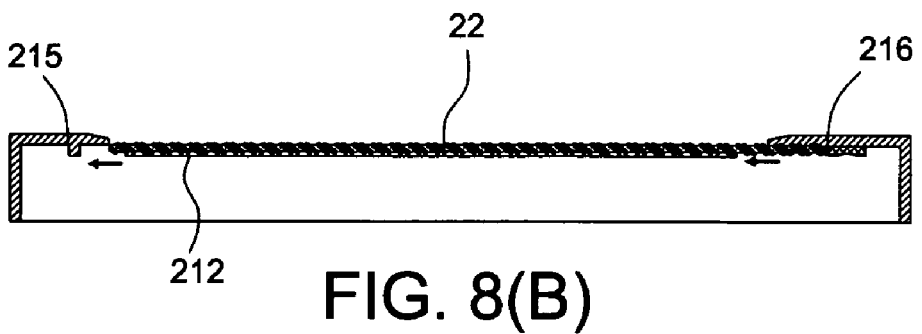
Figure 8C:
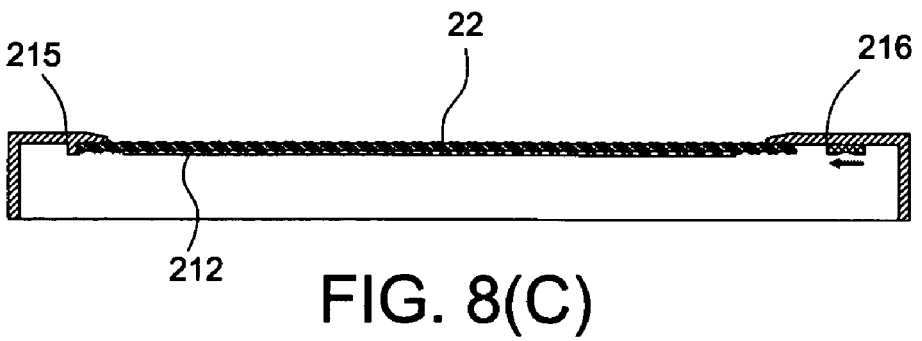
Figure 8D:
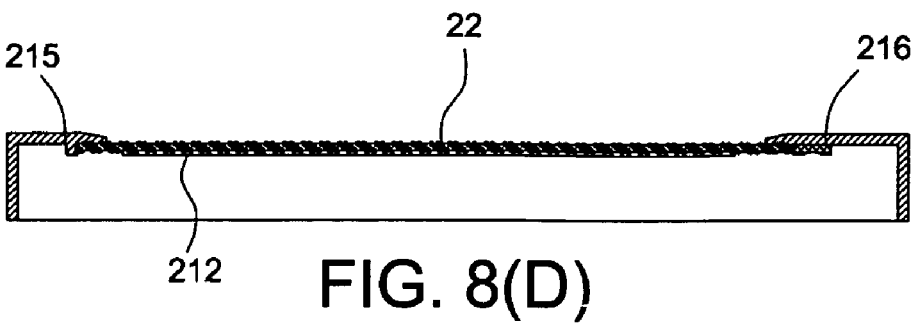

FIGS. 8(A) to 8(D) show schematic illustration of the glass plate mounted to the housing in still another way, wherein the length of the glass plate is smaller than the distance from the front rib to the back rib and the back rib is movable. As shown in FIG. 8(A), because a clearance D1 exists between the side rib 212 and the back rib 2162, the first end of the glass plate 22 is first inserted into the clearance D1. Thereafter, as shown in FIG. 8(B), the second end of the glass plate 22 may be pressed down such that the glass plate 22 smoothly contacts the side rib 212. Next, the glass plate 22 is moved toward the front end and then to the front rib 2152. Because the length of the glass plate 22 is shorter than the distance between the front rib 2152 and the back rib 2162, the back housing 216 is free from being bent and deformed when the glass plate 22 is pressed down. However, this method may cause a gap between the glass plate 22 and the back rib 2162. Consequently, as shown in FIG. 8(D), the back rib 2162 is a movable or rotatable member such that the back rib 2162 may be moved or rotated after the glass plate 22 has been positioned, and the back rib 2162 may push against the glass plate 22 so as to prevent the glass plate from being moved back and forth. This method may prevent the glass plate 22 from falling down by the front projecting portion 2151, the back projecting portion 2161 and the side rib 212.

Figure 9A:
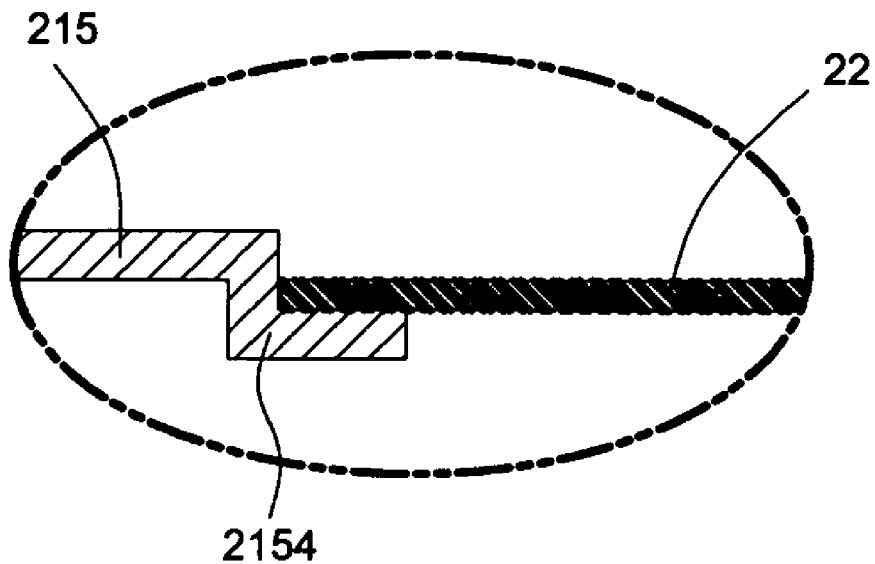
FIGS. 9(A) and (B) show other cross-sectional views taken along the line B-B of FIG. 2(B).
Figure 9B:
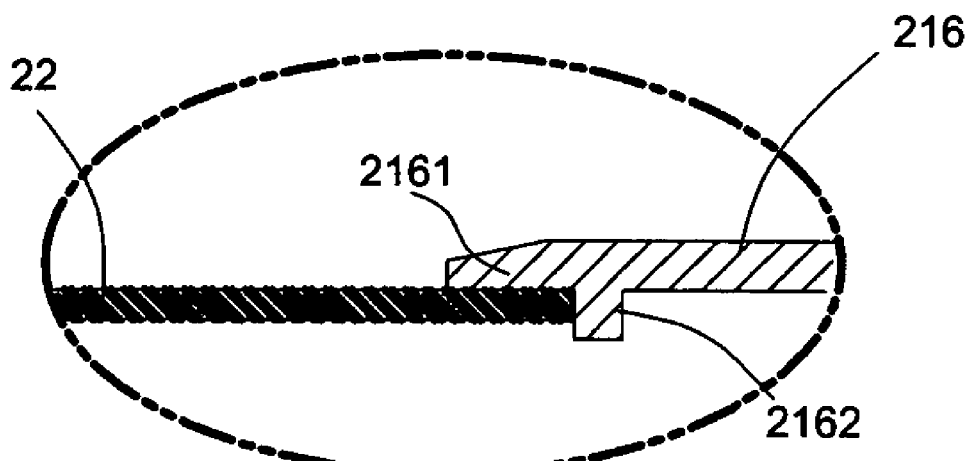

FIGS. 9(A) and (B) show other cross-sectional views taken along the line B-B of FIG. 2(B). As shown in FIG. 9(A), the front structure includes a front housing 215 and a front L-shaped fixing portion 2154. The glass plate 22 is supported by the front L-shaped fixing portion 2154. The number of the front L-shaped fixing portion(s) 2154 may be one or more than one. As shown in FIG. 9(B), the back structure includes a back housing 216, a back projecting portion 2161, and a back rib 2162. The glass plate 22 may push against the back rib 2162 for fastening by the resilience of the back projecting portion 2161. The number of the back rib(s) 2162 may be one or more than one.

Figure 10A:
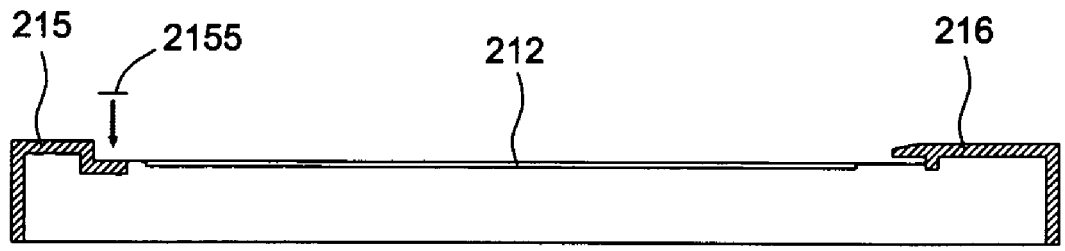
FIGS. 10(A) to 10(C) show schematic illustrations of the glass plate mounted to the housing of FIG. 9, wherein the length of the glass plate substantially equals the distance from the front rib to the back rib.
Figure 10B:
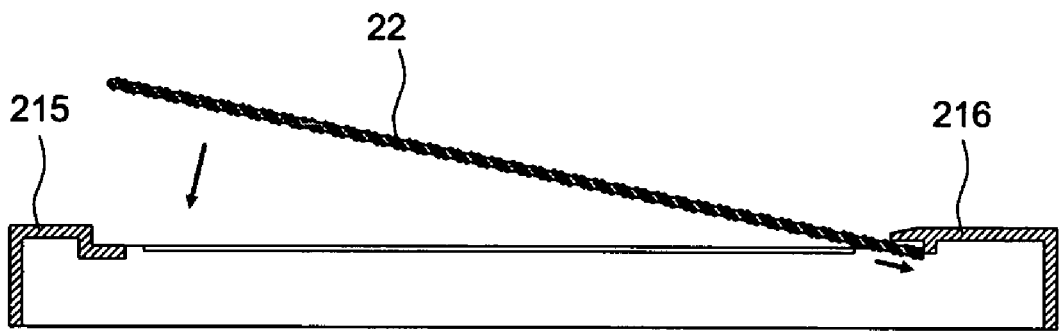
Figure 10C:
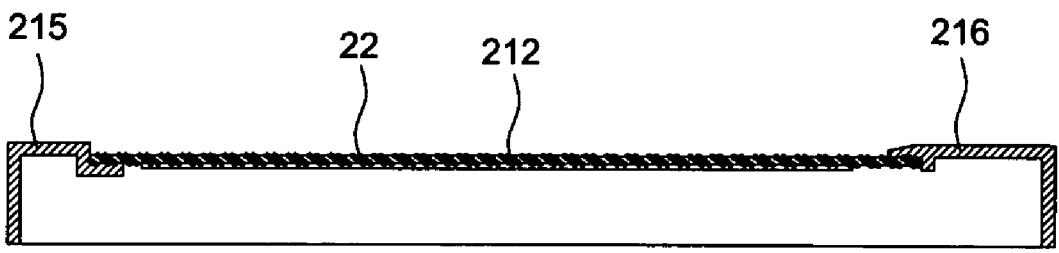

FIGS. 10(A) to 10(C) show schematic illustrations of the glass plate mounted to the housing of FIG. 9, wherein the length of the glass plate substantially equals the distance from the front rib to the back rib. As shown in FIG. 10(A), because the front L-shaped fixing portion 2154 of the front housing 215 has the L shape, the glass plate 22 may be mounted from the top, and this embodiment first attaches a double-sided adhesive component 2155 (e.g., a double-faced tape) to the front L-shaped fixing portion 2154 in order to fix the mounted glass plate. Next, as shown in FIG. 10(B), because a clearance D1 exists between the side rib 212 and the back rib 2162, the first end of the glass plate 22 is first inserted into the clearance D1. Thereafter, the second end of the glass plate 22 is pressed down such that the glass plate 22 smoothly contacts and fixes the double-sided adhesive component 2155.

Figure 11A:
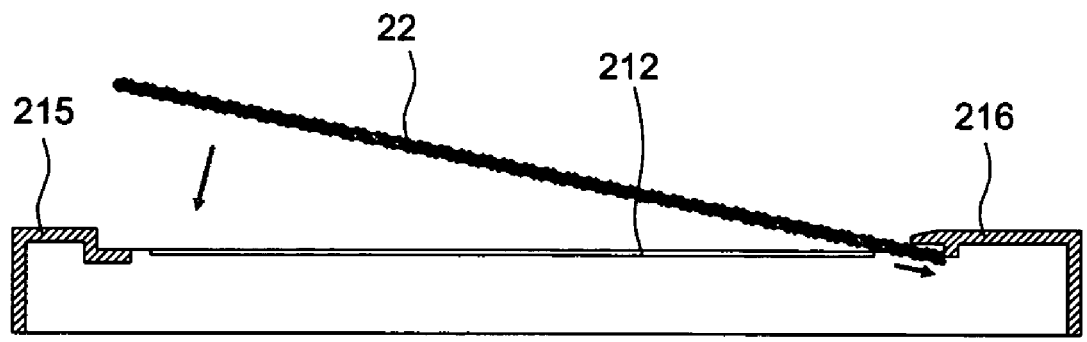
FIGS. 11(A) to 11(C) show other schematic illustrations of the glass plate mounted to the housing of FIG. 9, wherein the length of the glass plate substantially equals the distance from the front rib to the back rib.
Figure 11B:
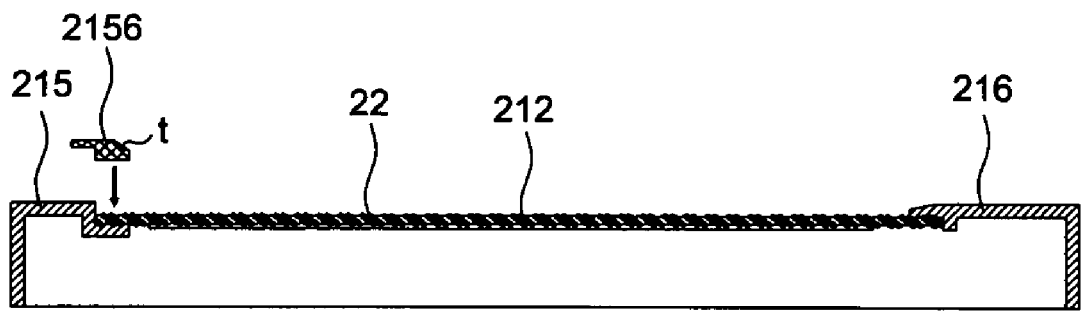
Figure 11C:
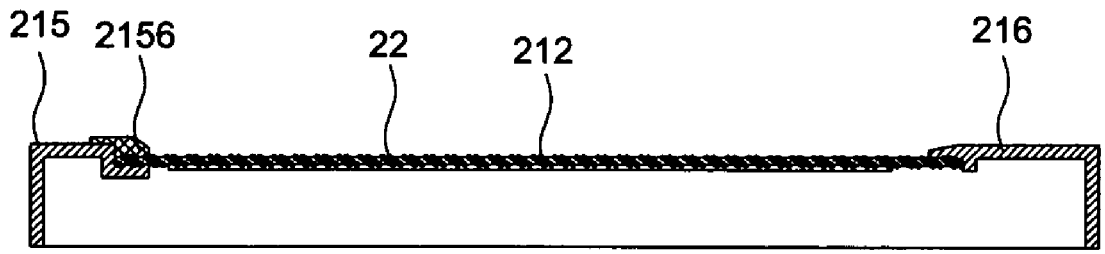

FIGS. 11(A) to 11(C) show other schematic illustrations of the glass plate mounted to the housing of FIG. 9, wherein the length of the glass plate substantially equals the distance from the front rib to the back rib. As shown in FIG. 11(A), because the front L-shaped fixing portion 2154 of the front housing 215 has the L shape, the glass plate 22 may be mounted from the top. That is, the first end of the glass plate 22 may be first inserted into the clearance D1, and the second end of the glass plate 22 is pressed down such that the glass plate 22 smoothly contacts the front L-shaped fixing portion 2154. Then, as shown in FIGS. 11(B) and 11(C), a fastening member 2156 is inserted from the top and is fastened to the front L-shaped fixing portion 2154 so as to hold and fix the glass plate 22.

Figure 12:
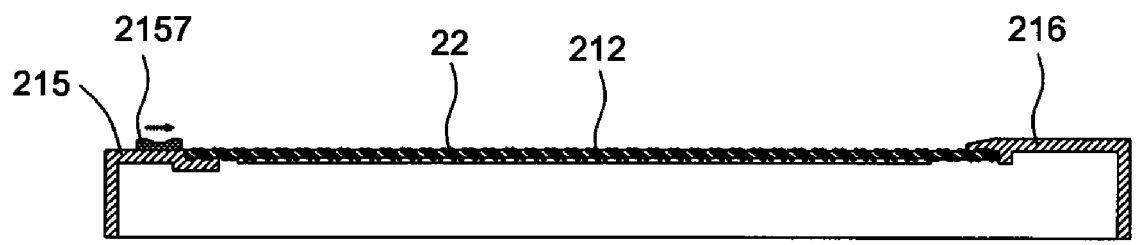
FIG. 12 shows still another schematic illustration of the glass plate mounted to the housing of FIG. 9.

Of course, as shown in FIG. 12, it is also possible to movably arrange a fastening member 2157 on the front housing 215. After the glass plate 22 is placed on the front L-shaped fixing portion 2154, the fastening member 2157 is moved to fix and hold the glass plate 22.

While certain exemplary embodiments have been described and shown in the accompanying drawings, it is to be understood that such embodiments are merely illustrative of and not restrictive on the broad invention, and that this invention not be limited to the specific construction and arrangement shown and described, since various other modifications may occur to those ordinarily skilled in the art. For instance, the side ribs, the front rib and the back rib may be in the shape of a complete and long rib, or composed of a plurality of short ribs.

According to the invention, because the glass plate is located above the housing, the book's binding portion may be completely attached to the glass plate when the book is scanned. Thus, the optical path of the optical module may reach the book's binding portion. Consequently, it is possible to prevent shadows and deformations from being caused in the scanned image corresponding to the book's binding portion. Thus, a clear scanned image may be obtained. In addition, because the structure of the invention is simple, the manufacturing cost may be advantageously reduced.

The document support structure of the flatbed scanner may be applied to information associated electrical apparatuses such as scanners or copiers.

What is claimed is:

1. A flatbed scanner with a short border, the flatbed scanner comprising:
    a housing having a bottom, two sides, a front part and a back part;
    a glass plate fixed to the housing to form a scanning platform such that a scanning area of the flatbed scanner extends to the two sides;
    a front rib formed at a bottom face of the front part of the housing and extending downward;
    a back rib formed at a bottom face of the back part of the housing and extending downward, wherein an inner distance from the back rib to the front rib is not smaller than the length of the glass plate; and
    side ribs formed between the two sides of the housing and extending inward, wherein the height of the side ribs is under the bottom faces of the front part and the back part so as to form a fastening gap between the side ribs and the bottom face of the front part and between the side ribs and the bottom face of the back part;
    wherein the glass plate is inserted into the fastening gap, and a distance between the side ribs is smaller than a width of the glass plate so that the glass plate is held.

2. The flatbed scanner according to claim 1, wherein the heights of the two sides are the same as those of the side ribs.

3. The flatbed scanner according to claim 1, wherein the heights of the two sides are greater than those of the side ribs.

4. The flatbed scanner according to claim 1, wherein the heights of the two sides are greater than those of the side ribs by a value smaller than the thickness of the glass plate.

5. The flatbed scanner according to claim 4, wherein there is a gap between inner side surfaces of the two sides, and the width of the gap is the same as the width of the glass plate so as to restrict the glass plate to move in a width direction.

6. The flatbed scanner according to claim 1, wherein the front rib further comprises an extension extending inward.

7. The flatbed scanner according to claim 6, wherein when the distance from the back rib to the front rib is greater than the length of the glass plate, an engagement piece is inserted into the clearance between the front rib and the extension so as to restrict the glass plate to move in a back and forth direction.

8. The flatbed scanner according to claim 1, wherein the back rib further comprises an extension extending inward.

9. The flatbed scanner according to claim 8, wherein when the distance from the back rib to the front rib is greater than the length of the glass plate, an engagement piece is inserted into the clearance between the back rib and the extension so as to restrict the glass plate to move in a back and forth direction.

10. The flatbed scanner according to claim 1, wherein the front rib is rotatable or movable.

11. The flatbed scanner according to claim 10, wherein after the glass plate is inserted into the fastening gap, the front rib is rotated or moved to an end portion of the glass plate so as to restrict the glass plate to move in a back and forth direction.

12. The flatbed scanner according to claim 1, wherein the back rib is rotatable or movable.

13. The flatbed scanner according to claim 12, wherein after the glass plate is inserted into the fastening gap, the back rib is rotated or moved to an end portion of the glass plate so as to restrict the glass plate to move in a back and forth direction.

14. A flatbed scanner with a short border, the flatbed scanner comprising:
- a housing having a bottom, two sides, a front part and a back part;
- a glass plate fixed to the housing to form a scanning platform such that a scanning area of the flatbed scanner extends to the two sides;
- a front L-shaped fixing portion formed at the front part of the housing;
- a back rib formed at a bottom face of the back part of the housing and extending downward, wherein an inner distance from the back rib to the L-shaped fixing portion is not smaller than a length of the glass plate; and
- side ribs formed between the two sides and extending inward, wherein the height of the side ribs is under the bottom faces of the front part and the back part of the housing so as to form a fastening gap between the side ribs and the bottom face of the back part;
- wherein the glass plate is inserted into the fastening gaps, and the distance between the side ribs is smaller than the width of the glass plate so that the glass plate is held.

15. The flatbed scanner according to claim 14, further comprising a fastening member fastened to the front part of the housing so as to hold the glass plate placed into the front L-shaped fixing portion.

16. The flatbed scanner according to claim 14, further comprising a fastening member, which is movably fastened to the front part of the housing so as to move the fastening member and thus to hold the glass plate after the glass plate is placed into the front L-shaped fixing portion.

17. The flatbed scanner according to claim 14, wherein the heights of the two sides are the same as those of the side ribs.

18. The flatbed scanner according to claim 14, wherein the heights of the two sides are greater than those of the side ribs.

19. The flatbed scanner according to claim 14, wherein the heights of the two sides are greater than those of the side ribs by a value smaller than a thickness of the glass plate.

20. The flatbed scanner according to claim 19, wherein there is a gap between the inner side surfaces of the two sides, and the width of the gap is the same as the width of the glass plate so as to restrict the glass plate to move in a width direction.

* * * * *